(12) United States Patent
Takeda

(10) Patent No.: US 6,345,317 B1
(45) Date of Patent: Feb. 5, 2002

(54) INFORMATION PROCESSING SYSTEM HAVING A PLURALITY OF INPUT/OUTPUT DEVICES AND A PLURALITY OF PROCESSORS

(75) Inventor: Kazumasa Takeda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/305,983

(22) Filed: May 5, 1999

(30) Foreign Application Priority Data

May 8, 1998 (JP) .......................................... 10-126485

(51) Int. Cl.$^7$ .............................................. G06F 15/16
(52) U.S. Cl. .............................................. 710/2; 710/12
(58) Field of Search .............................. 710/2, 3, 12, 1

(56) References Cited

U.S. PATENT DOCUMENTS

| | | | | |
|---|---|---|---|---|
| 4,207,609 A | * | 6/1980 | Luiz | 710/1 |
| 5,613,153 A | * | 3/1997 | Arimilli | 710/1 |
| 5,671,441 A | * | 9/1997 | Glassen | 710/1 |
| 5,678,060 A | * | 10/1997 | Yokoyama | 710/1 |
| 5,822,610 A | * | 10/1998 | Fung | 710/1 |

FOREIGN PATENT DOCUMENTS

| | | |
|---|---|---|
| JP | 62-297960 | 12/1987 |
| JP | 4-10825 | 1/1992 |
| JP | 4-81049 | 3/1992 |
| JP | 4-305757 | 10/1992 |
| JP | 9-322203 | 12/1997 |

* cited by examiner

*Primary Examiner*—Eric Coleman
(74) *Attorney, Agent, or Firm*—Rosenman & Colin LLP

(57) ABSTRACT

A device controller is provided between a plurality of processors and a plurality of input/output devices each having a plurality of input/output terminals. The device controller manages mapping data defining a mapping of the input/output devices and terminals to the processors as well as their state data indicating a mounted state, a not-mounted state, etc., and controls the transmission/reception of information between the processors and the input/output devices by referring to the mapping data and state data. The device controller includes a data change controller which performs data addition, deletion, or updating on the mapping data to accommodate a system change.

3 Claims, 20 Drawing Sheets

Fig.9

| INPUT/OUTPUT DEVICE NUMBER | PROCESSOR NUMBER |
|---|---|
| 0 | 0 |
| 1 | 0 |
| 2 | 1 |
| ⋮ | ⋮ |
| j | $i$ |

Fig.10

| TERMINAL NUMBER | PROCESSOR NUMBER |
|---|---|
| 0 | 0 |
| 1 | 0 |
| 2 | 0 |
| ⋮ | ⋮ |
| k | $i$ |

| | |
|---|---|
| NW | DESTINATION TYPE (NW OR PROCESSOR) |
| 1 | DESTINATION NW NUMBER |
| 1 | DESTINATION HW NUMBER |
| HW CONTROL COMMAND | SIGNAL TYPE |

| | |
|---|---|
| PROCESSOR | DESTINATION TYPE (NW OR PROCESSOR) |
| 1 | ORIGINATING NW NUMBER |
| 1 | ORIGINATING HW NUMBER |
| HW FAILURE NOTIFICATION | SIGNAL TYPE |

Fig.16

| PROCESSOR NUMBER | NW NUMBER | HW NUMBER |
|---|---|---|
| 0 | 0 | 0 |
|   |   | 1 |
|   | 1 | 0 |
|   |   | 1 |
| 1 | 2 | 0 |
|   |   | 1 |

Fig.17

| NW NUMBER | PROCESSOR NUMBER |
|---|---|
| 0 | 0 |
| 1 | 0 |
| 2 | 1 |

Fig.18

| HW NUMBER | PROCESSOR NUMBER |
|---|---|
| 0-0 | 0 |
| 0-1 | 0 |
| 1-0 | 0 |
| 1-1 | 1 |
| 2-0 | 1 |
| 2-1 | 1 |

Fig. 19

| PROCESSOR NUMBER | PROCESSOR STATE |
|---|---|
| 0 | 1 |
| 1 | 1 |

0: NOT MOUNTED
1: MOUNTED
2: UNDER CONSTRUCTION

Fig. 20

| NW NUMBER | STATE |
|---|---|
| 0 | 1 |
| 1 | 1 |
| 2 | 1 |

| HW NUMBER | STATE |
|---|---|
| 0-0 | 1 |
| 0-1 | 1 |
| 1-0 | 1 |
| 1-1 | 1 |
| 2-0 | 1 |
| 2-1 | 1 |

0: NOT MOUNTED
1: MOUNTED
2: CLOSED
3: UNDER CONSTRUCTION

Fig.23

| NW NUMBER | STATE |
|---|---|
| 0 | 1 ⇨ 1 |
| 1 | 1 |
| 2 | 1 |

Fig.24

| NW NUMBER | CONTROLLING PROCESSOR NUMBER |
|---|---|
| 0 | 0 ⇨ 1 |
| 1 | 0 |
| 2 | 1 |

Fig.25

| HW NUMBER | STATE |
|---|---|
| 0-0 | 1 |
| 0-1 | 1 |
| 1-0 | 1 ⇨ 1 |
| 1-1 | 1 |
| 2-0 | 1 |
| 2-1 | 1 |

Fig.26

| HW NUMBER | CONTROLLING PROCESSOR NUMBER |
|---|---|
| 0-0 | 0 |
| 0-1 | 0 |
| 1-0 | 0 ⇨ 1 |
| 1-1 | 1 |
| 2-0 | 1 |
| 2-1 | 1 |

INFORMATION PROCESSING SYSTEM HAVING A PLURALITY OF INPUT/OUTPUT DEVICES AND A PLURALITY OF PROCESSORS

BACKGROUND OF THE INVENTION

1. Field of the Invention

The present invention relates to an information processing system having a plurality of input/output devices and a plurality of processors.

2. Description of the Related Art

In the prior art, it is known to provide an information processing system, such as a communications control system or switching system, comprising a plurality of processors and thus designed to distribute a processing load among them. It is desired that such an information processing system be able to readily handle system changes resulting from a system expansion, etc. and various other changes being made while the system is in operation.

In the prior art information processing system, however, associations between the processors and input/output devices or network devices and between the processors and terminals or highways are fixedly defined. This leads to the problem that, when an input/output device is added or removed, for example, extra work for bus reconnection, etc. becomes necessary to accommodate the change in the processor mapping. Furthermore, in the prior art, since the association between the processors and terminals or highways is fixedly defined and is next to impossible to change, the association has had to be established by predicting the amount of control, etc. on the terminals or highways when constructing the system. That is, the prior art configuration has had the problem that processor load sharing, etc. cannot be addressed flexibly once the system is put in operation.

SUMMARY OF THE INVENTION

It is an object of the present invention to provide an information processing system wherein associations with the processors can be changed flexibly with a relatively simple configuration.

According to the present invention, there is provided an information processing system comprising: a plurality of input/output devices each having a plurality of input/output terminals; a plurality of processors; and a device controller, provided between the input/output devices and the processors, for storing mapping data defining a mapping of the input/output devices and input/output terminals to the processors and state data indicating states of the input/output devices, terminals, and processors, and for controlling transfer of transmit/receive information from the input/output devices and input/output terminals to the processors and vice versa by referring to the mapping data and the state data.

BRIEF DESCRIPTION OF THE DRAWINGS

FIG. 9 is a diagram showing one example of processor versus input/output device mapping data;

FIG. 10 is a diagram showing one example of processor versus terminal mapping data;

FIG. 16 is a diagram showing one example of a mapping table providing a mapping of NWs and HWs to call processors;

FIG. 17 is a diagram showing one example of a mapping table providing a mapping of NWs to call processors;

FIG. 18 is a diagram showing one example of a mapping table providing a mapping of HWs to call processors;

FIG. 19 is a diagram showing one example of processor state data;

FIG. 20 is a diagram showing one example of network device state data and highway state data;

FIGS. 23 and 24 are diagrams for explaining the remapping of an NW;

FIGS. 25 and 26 are diagrams for explaining the remapping of an HW;

DESCRIPTION OF THE PREFERRED EMBODIMENTS

Figure 1:
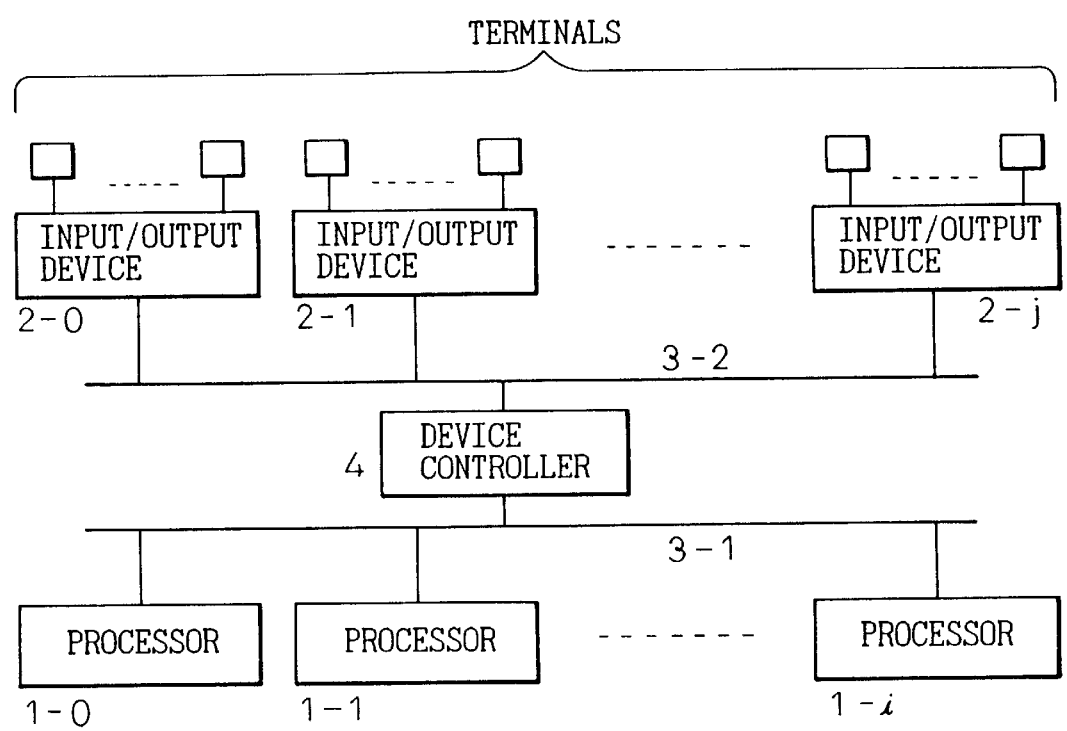
FIG. 1 is a block diagram showing a system according to one embodiment of the present invention.

FIG. 1 is a diagram for explaining a system according to one embodiment of the present invention. Reference numerals 1-0 to 1-i are processors, 2-0 to 2-j are input/output devices, 3-1 and 3-2 are buses, and 4 is a device controller. The input/output devices 2-0 to 2-j each have a plurality of terminals. The device controller 4 is connected between the bus 3-1, to which the plurality of processors 1-0 to 1-i are connected, and the bus 3-2, to which the plurality of input devices 2-0 to 2-j are connected, and is provided to enable the association between the processors 1-0 to 1-i and the input/output devices 2-0 to 2-j or their terminals to be changed.

Figure 2:
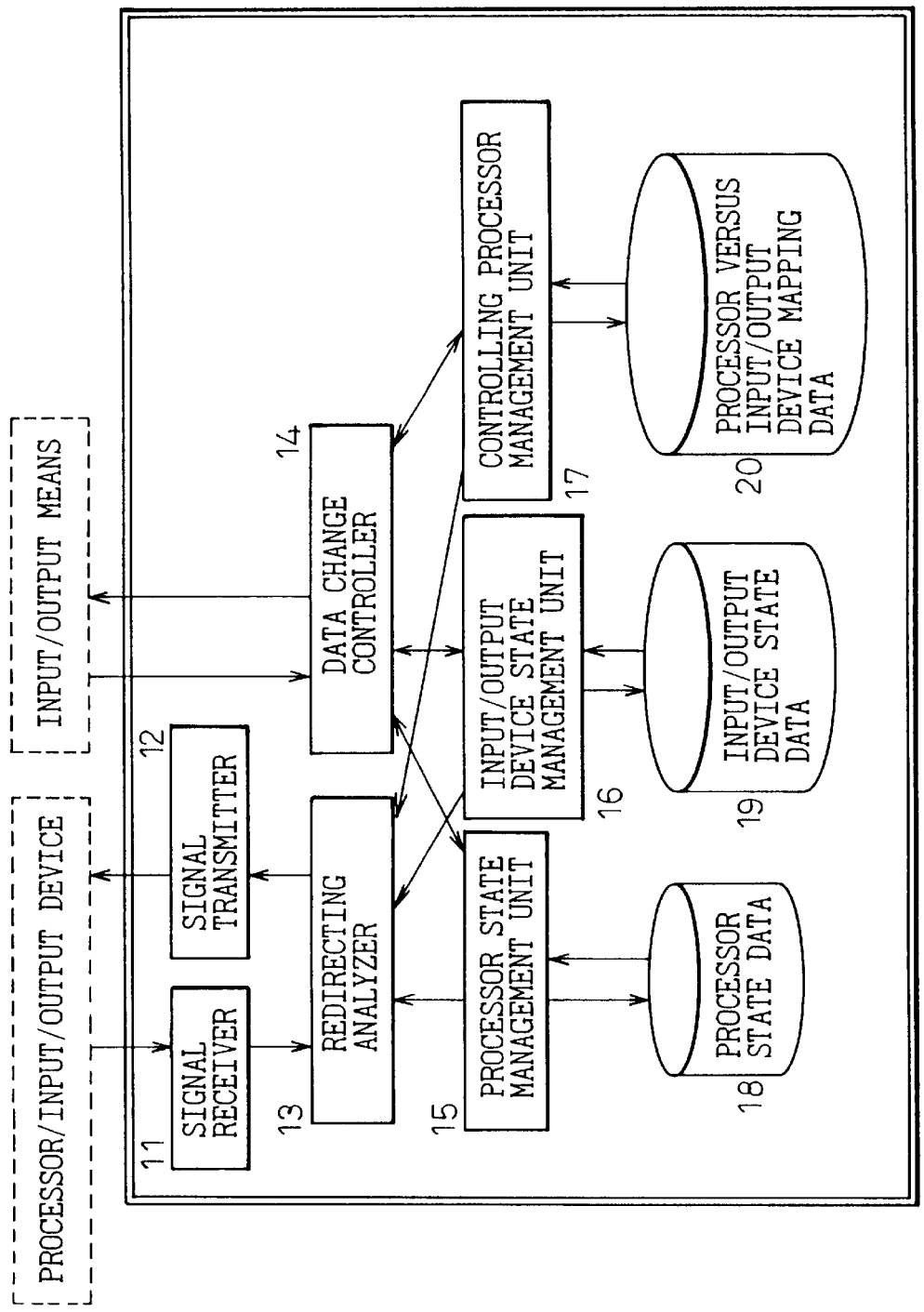
FIG. 2 is a block diagram showing the details of a device controller 4 in FIG. 1.

FIG. 2 is a diagram showing the details of the device controller 4 according to the one embodiment of the present invention. Reference numeral 11 is a signal receiver, 12 is a signal transmitter, 13 is a redirecting analyzer, 14 is a data change controller, 15 is a processor state management unit, 16 is an input/output device state management unit, 17 is a controlling processor management unit, 18 is a memory for storing processor state data, 19 is a memory for storing input/output device state data, and 20 is a memory for storing processor versus input/output device mapping data.

The signal receiver 11 and signal transmitter 12 are connected, for example, to the buses 3-1 and 3-2 in FIG. 1, and receive and transmit signals transferred between the processors and the input/output devices. The data change controller 14 is connected to an input/output means such as a maintenance terminal, and controls data changes in each unit in accordance with input information.

The processor state data stored in the memory 18 includes a normal mounted state and other states of the processors. The input/output device state data stored in the memory 19 includes a normal mounted state and other states of the input/output devices and their relationship with the terminals. The processor versus input/output device mapping data stored in the memory 20 is data that indicates the association between the processors and the input/output devices or their terminals.

The processor state management unit 15 performs processing such as the writing, updating, erasing, and reading of the processor state data in the memory 18 in accordance with instructions from the data change controller 14. The input/output device state management unit 16 performs processing such as the writing, updating, erasing, and reading of the input/output device state data in the memory 19 in accordance with instructions from the data change controller 14. Likewise, the controlling processor management unit 17 performs processing such as the writing, updating, erasing, and reading of the processor versus input/output device mapping data in the memory 20.

Figure 3:
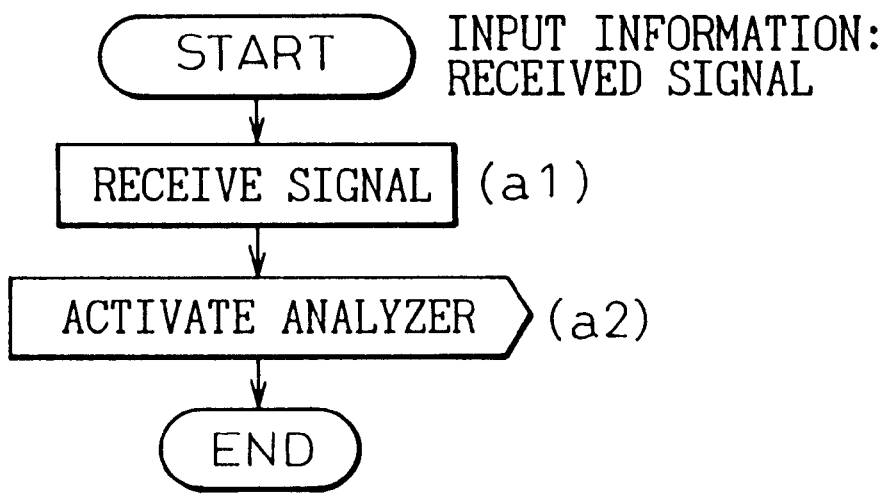
FIG. 3 is a flowchart illustrating the operation of a signal receiver 11 in FIG. 2.
Figure 4:
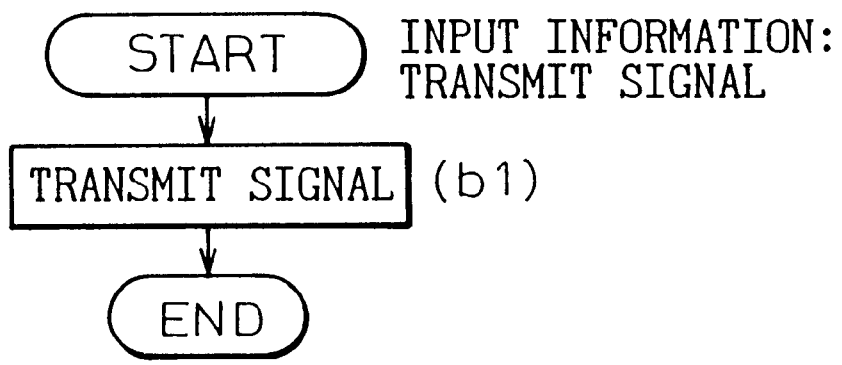
FIG. 4 is a flowchart illustrating the operation of a signal transmitter 12 in FIG. 2.

FIGS. 3 and 4 show flowcharts illustrating the operation of the signal receiver 11 and signal transmitter 12, respectively. As shown, in FIG. 3, the signal receiver 11 in FIG. 2 receives a signal from a processor or an input/output device via the bus 3-1 or 3-2 (see FIG. 1) (a1), and activates the redirecting analyzer 13 (a2). As shown in FIG. 4, the signal transmitter 12, when the transmit signal received from the processor or input/output device is input, sends out the signal onto the bus 3-2 or 3-1 shown in FIG. 1 for transmission to the associated input/output device or processor (b1).

Figure 5:
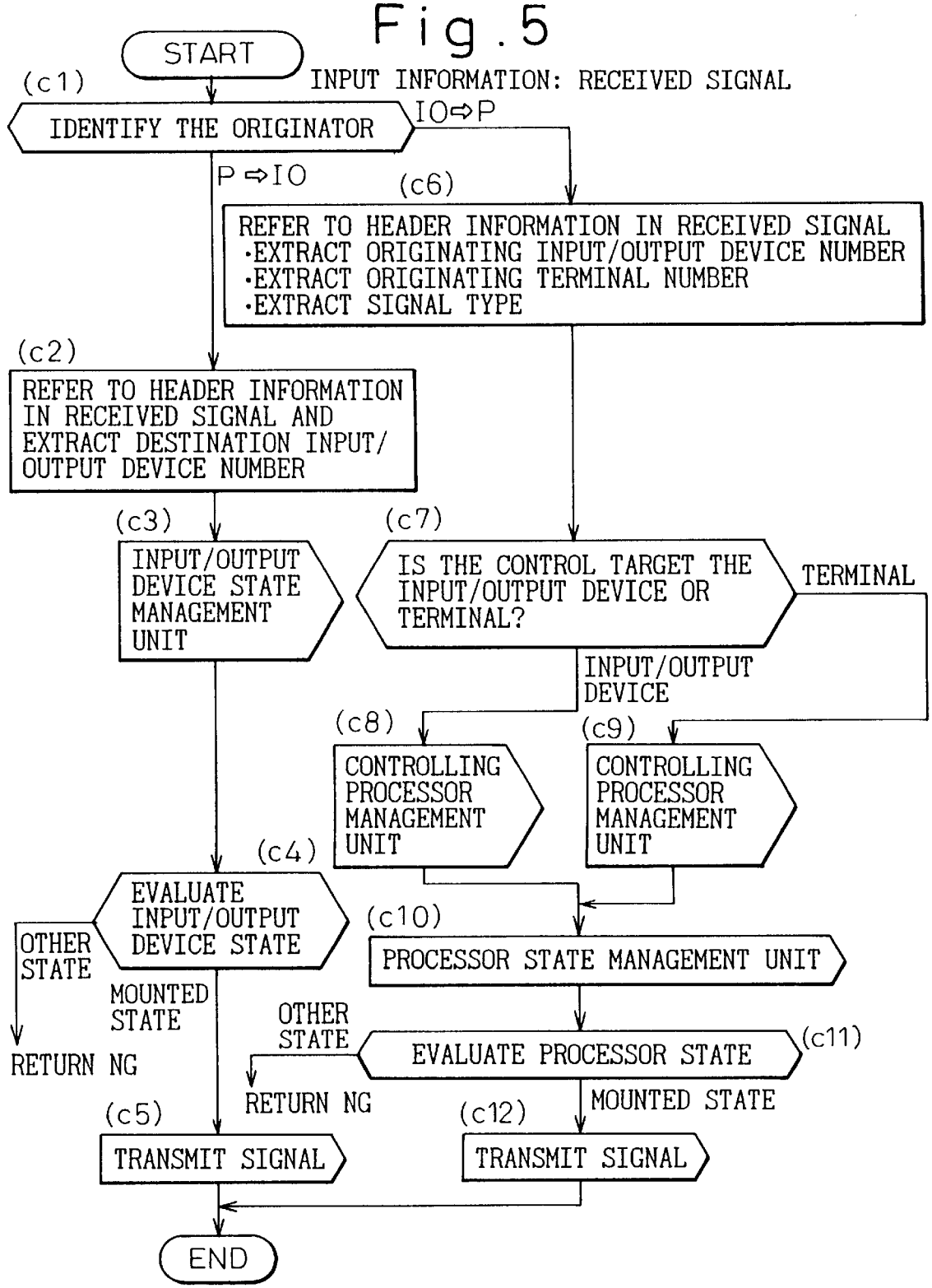
FIG. 5 is a flowchart illustrating the operation of a redirecting analyzer 13 in FIG. 2.

FIG. 5 shows a flowchart illustrating the operation of the redirecting analyzer 13. When the signal receiver 11 in FIG. 2 receives a signal from a processor or an input/output device via the bus 3-1 or 3-2 (see FIG. 1), the redirecting analyzer 13 is activated, and identifies the signal originator from the received information (c1). If the signal is from the processor to an input/output device (P→IO), a destination input/output device number is extracted by referring to the header information (FIG. 12) in the received signal (c2); then, a call is issued to the input/output device state management unit 16 (c3), and the state of the input/output device is evaluated by referring to the input/output device state data stored in the memory 19 (c4). If the input/output device is mounted, the signal is transmitted to the input/output device (c5). Otherwise, that is, if the device is not mounted or is in a failed state, for example, NG is returned.

If the signal originator is an input/output device (IO→P), the originating input/output device number, the originating terminal number, and the signal type are extracted by referring to the header information (FIG. 12) in the received signal (c6), based on which it is determined whether the control target is the input/output device or the terminal (c7). In either case, a call is issued to the controlling processor management unit 17 (c8 or c9) based on the result of the determination, to identify the processor associated with the originating input/output device or terminal. Next, a call is issued to the processor state management unit 15 (c10), and by referring to the processor state data stored in the memory 18, it is determined whether the processor associated with the originating input/output device or terminal is in a mounted state or not (c11). If the processor is mounted, the signal is transmitted to the processor (c12); otherwise, NG is returned.

Figure 6:
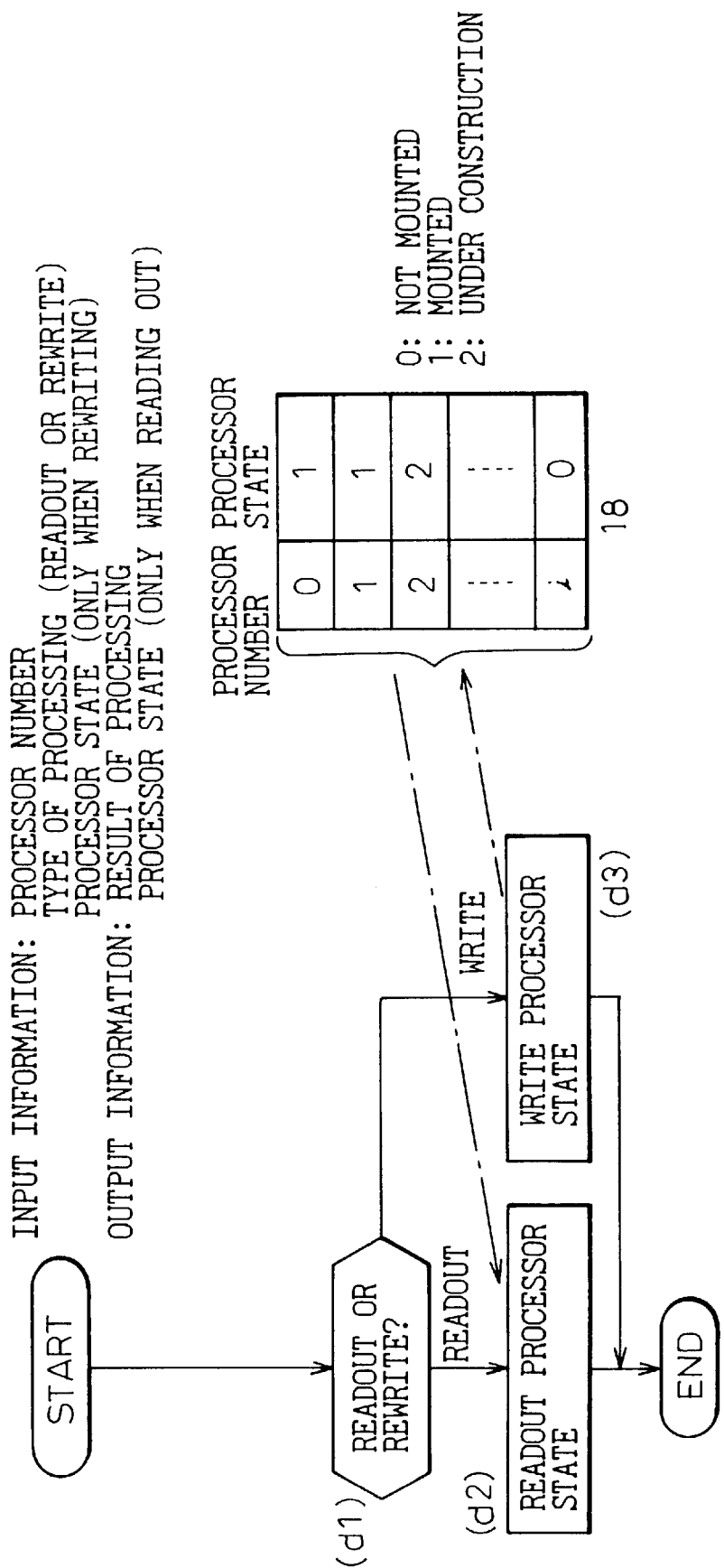
FIG. 6 is a flowchart illustrating the operation of a processor state management unit 15 in FIG. 2.

FIG. 6 shows a flowchart illustrating the operation of the processor state management unit 15. The memory 18 managed by the processor state management unit 15 in FIG. 2 stores processor numbers in association with processor states; the processor states here include NOT MOUNTED=0, MOUNTED=1, and UNDER CONSTRUCTION=2. In the example of FIG. 6, the processor numbers 0 and 1 are mounted, the processor number 2 is not mounted, and the processor number i is under construction. The under construction state refers to an uncomplete state before completion of a startup procedure in a system expansion process, a repairing state in the event of trouble occurrence, etc.

The input information to the processor state management unit 15 includes the processor number, the type of processing (readout or write), the processor state (only when rewriting), etc., and the output information includes the result of the processing and the processor state (only when reading out). When activated, the processor state management unit 15 determines whether the requested operation is a readout or a rewrite operation (d1), and reads out the state data of the processor from the memory 18 (d2) in the case of a readout operation or writes the state data of the processor to the memory 18 (d3) in the case of a write operation.

Figure 7:
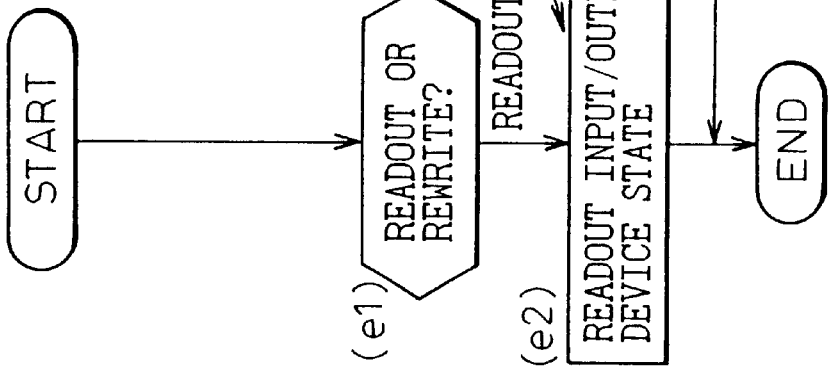
FIG. 7 is a flowchart illustrating the operation of an input/output device state management unit 16 in FIG. 2.

FIG. 7 shows a flowchart illustrating the operation of the input/output device state management unit 16. FIG. 7 shows an example in which the memory 19 for storing the input/output device state data is constructed from a memory 19a for storing the input/output device numbers and their states and a memory 19b for storing the terminal numbers and their states. The state data include NOT MOUNTED=0, WORKING (mounted and properly operating)=1, CLOSED=2, and UNDER CONSTRUCTION=3, and an example is shown in FIG. 7. In the example shown here, the input/output device number 1 is working, the input/output device number j is not mounted, the terminal numbers 0, 1, and 2 are working, and the terminal number k is not mounted.

The input information to the input/output device state management unit 16 includes the type of processing (readout or write), the processing target (input/output device or terminal), the state (only when rewriting), etc., and the output information includes the result of the processing and the state (only when reading out).

When activated, the input/output device state management unit 16 determines whether the requested operation is a read or a rewrite operation (e1); in the case of a read operation, the state data, such as NOT MOUNTED, WORKING, etc., is read from the memory 19a or 19b based on the input/output device number or terminal number of the processing target (e2), while in the case of a write operation, the state data, such as NOT MOUNTED, WORKING, etc., is written to the memory 19a or 19b based on the input/output device number or terminal number (e3).

Figure 8:
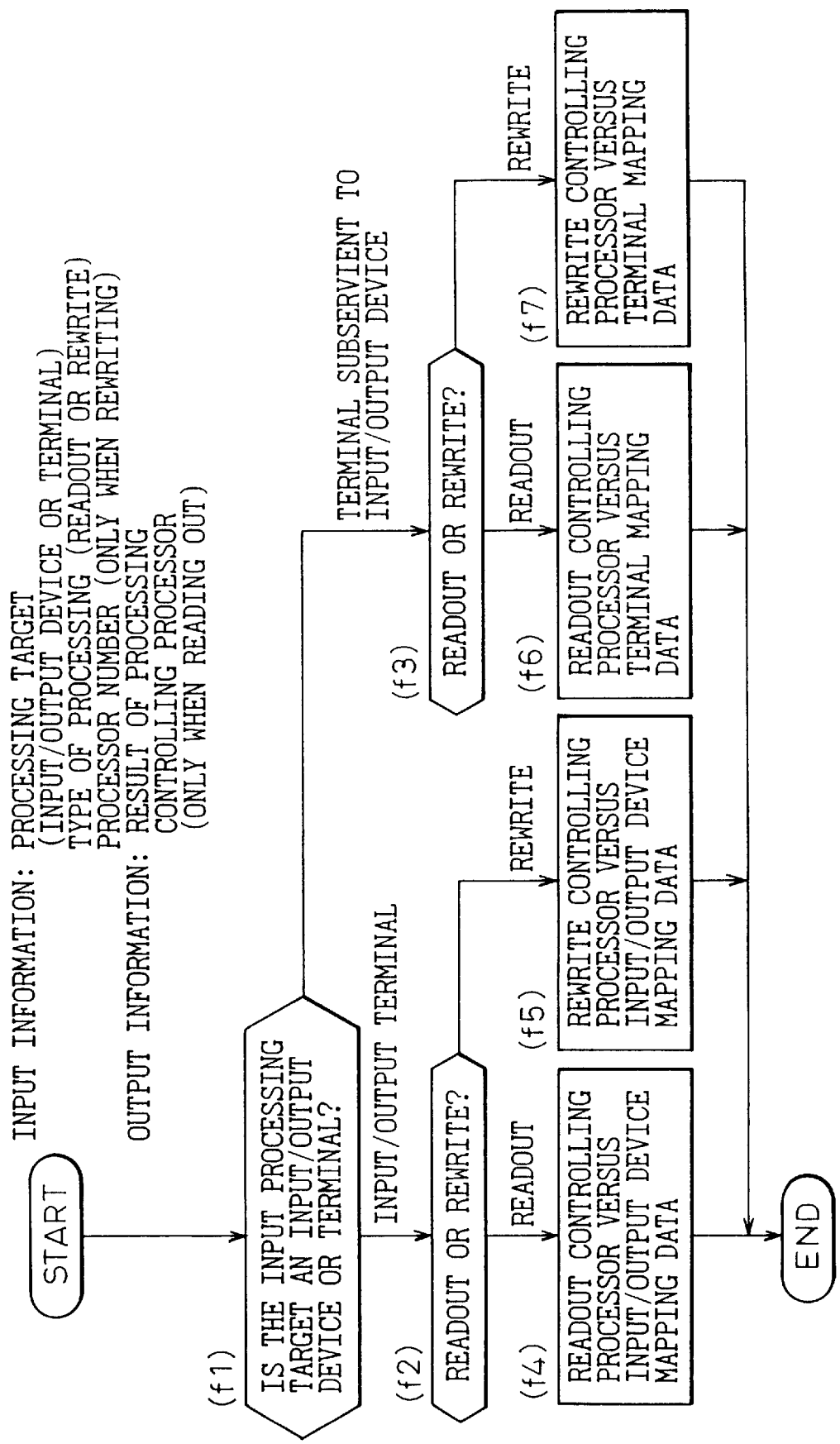
FIG. 8 is a flowchart illustrating the operation of a controlling processor management unit 17 in FIG. 2.

FIG. 8 shows a flowchart illustrating the operation of the controlling processor management unit 17. The input information to the controlling processor management unit 17 includes the processing target (input/output device or terminal), the type of processing (readout or rewrite), and the processor number (only when rewriting), and the output information includes the result of the processing and the controlling processor (only when reading out).

When activated, the controlling processor management unit 17 first determines whether the processing target is an input/output device or a terminal (f1) and, in the case of an input/output device, further determines whether the requested operation is a readout or a rewrite operation (f2); then, in the case of a readout operation, the controlling processor versus input/output device mapping data is read from the memory 20 (f4). In the case of a rewrite operation, the controlling processor versus input/output device mapping data stored in the memory 20 is rewritten (f5). If the processing target is a terminal, it is determined whether the requested operation is a readout or a rewrite operation (f3); in the case of a readout operation, the controlling processor versus terminal mapping data is read out (f6). In the case of a rewrite operation, the controlling processor versus terminal mapping data is rewritten (f7).

FIGS. 9 and 10 show an example of the controlling processor versus input/output device mapping data and an example of the controlling processor versus terminal mapping data, respectively. The processor versus input/output device mapping data shown in FIG. 9 provides, for example, a mapping of the processor numbers 0 to i of the processors 1-0 to 1-i to the numbers 0 to j of the input/output devices 2-0 to 2-j, thereby showing that the input/output device 2-1 with number 1 is controlled by the processor 1-0 with number 0, the input/output device 2-2 with number 2 is controlled by the processor 1-1 with number 1, and so on.

The processor versus terminal mapping data in FIG. 10 provides, for example, a mapping of the numbers of the terminals subservient to each of the input/output devices 2-0 to 2-j to the processor numbers, thereby showing that the terminal with number 0 is controlled by the processor 1-0 with number 0, and the terminal with number k is controlled by the processor 1-i with number i.

Figure 11:
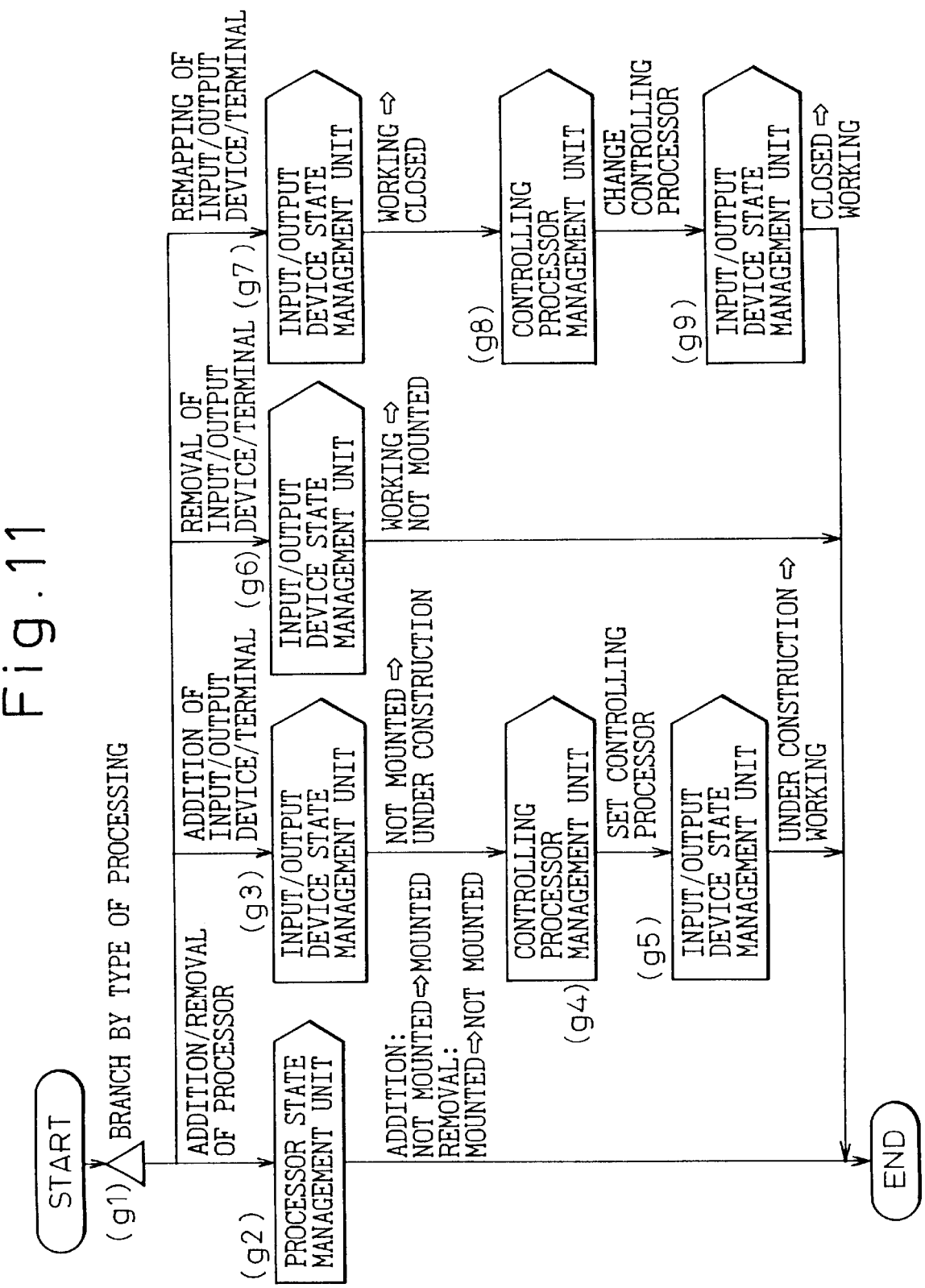
FIG. 11 is a flowchart illustrating the operation of a data change controller 14 in FIG. 2.

FIG. 11 is a flowchart illustrating the operation of the data change controller 14 of FIG. 2. First, the type of processing is identified based on the input information from the input/output means (g1). The type of processing here refers to the addition/removal of a processor, the addition of an input/output device/terminal, the removal of an input/output device/terminal, or the remapping of an input/output device/terminal. In the case of the addition/removal of a processor, a call is issued to the processor state management unit 15 (g2); in the case of an addition, the processor state of the corresponding processor number is changed from NOT MOUNTED=0 to MOUNTED=1, while in the case of a removal, the processor state of the corresponding processor number is changed from MOUNTED=1 to NOT MOUNTED=0.

In the case of the addition of an input/output device/terminal, a call is issued to the input/output device state management unit 16 (g3), and the corresponding input/output device state or terminal state stored in the memory 19 is first changed from NOT MOUNTED =0 to UNDER CONSTRUCTION=3. Next, a call is issued to the controlling processor management unit 15 (g4), the processor for controlling the added input/output device or terminal is set in the memory 20, and the added input/output device number or terminal number is associated with the processor number. Then, a call is issued to the input/output device state management unit 16 (g5), and the corresponding input/output device or terminal state data is changed from UNDER CONSTRUCTION=3 to WORKING=1.

In the case of the removal of an input/output device/terminal, a call is issued to the input/output device state management unit 16 (g6), and the state of the corresponding input/output device or terminal is changed from WORKING=1 to NOT MOUNTED=0. Accordingly, of the state data stored in the memory 19, the state data of the removed input/output device or terminal is updated to NOT MOUNTED (=0).

In the case of the remapping of an input/output device/terminal, first a call is issued to the input/output device state management unit 16 (g7), and the corresponding input/output device and terminal states are changed from WORKING=1 to CLOSED=2. Then, a call is issued to the controlling processor management unit 15 (g8), and the processor for controlling the remapped input/output device/terminal is rewritten; thereafter, a call is issued to the input/output device state management unit 16 (g9), and the state CLOSED=2 is updated to WORKING=1.

Figure 12:
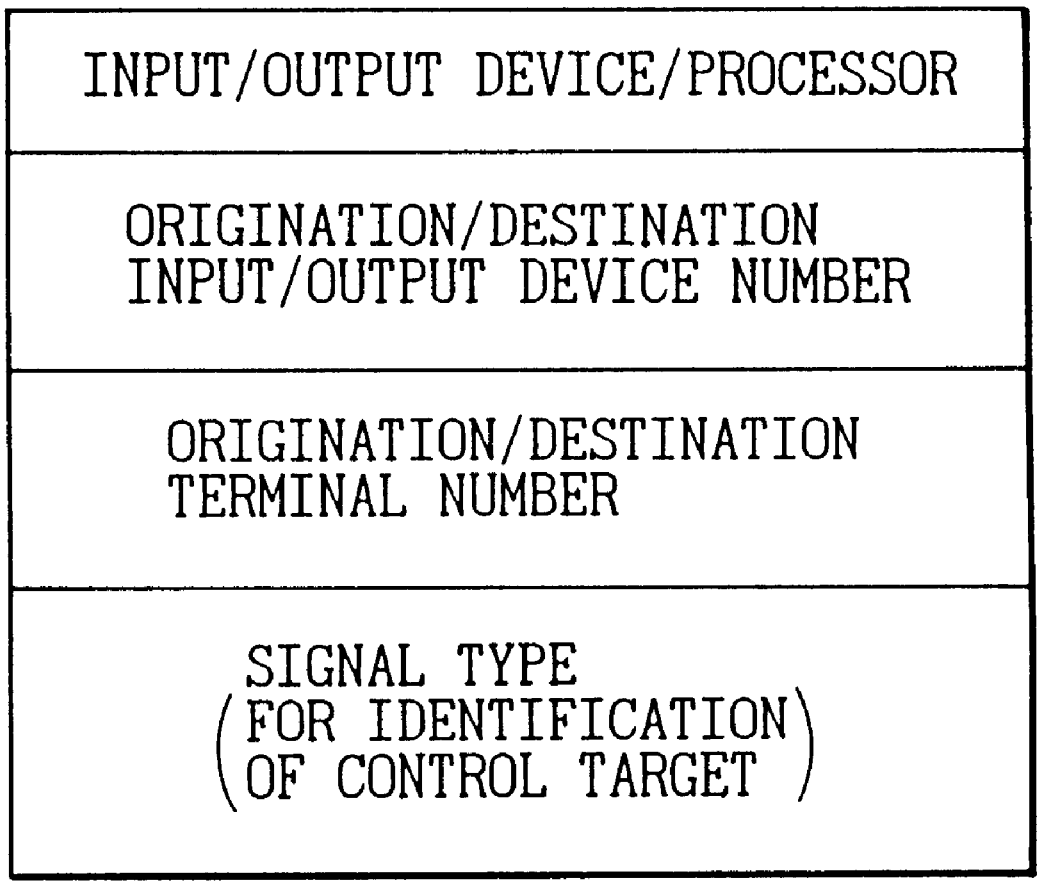
FIG. 12 is a diagram showing one example of header information.

FIG. 12 is a diagram showing one example of the header information. The header information contains "INPUT/OUTPUT DEVICE / PROCESSOR" which indicates whether the destination of the information is an input/output device (NW) or a processor, "ORIGINATION/DESTINATION INPUT/OUTPUT DEVICE NUMBER" which indicates the originating or destination input/output device number, "ORIGINATION/DESTINATION TERMINAL NUMBER" which indicates the originating or destination terminal number, and "SIGNAL TYPE". When the signal is from a processor, designated by one of reference numerals 1-0 to 1-i, to an input/output device, designated by one of reference numerals 2-0 to 2-j (see FIG. 1), for example, the processor sets the input/output device number or terminal number as the destination. In the device controller 4, the redirecting analyzer 16 analyzes the header information, and the signal transmitter 12 transmits the signal to the input/output device or terminal corresponding to the destination input/output device number or destination terminal number.

On the other hand, when the signal is from an input/output device or terminal to a processor, the processor number is extracted by referring to the controlling processor versus input/output device mapping data stored in the memory 20, based on the valid originating input/output device number or terminal number corresponding to the signal type, and the signal is transmitted to the processor corresponding to the extracted processor number. Therefore, if the association between the processor and the input/output device or terminal is changed, the signal from the input/output device or terminal can be transmitted to the newly associated processor.

Figure 13:
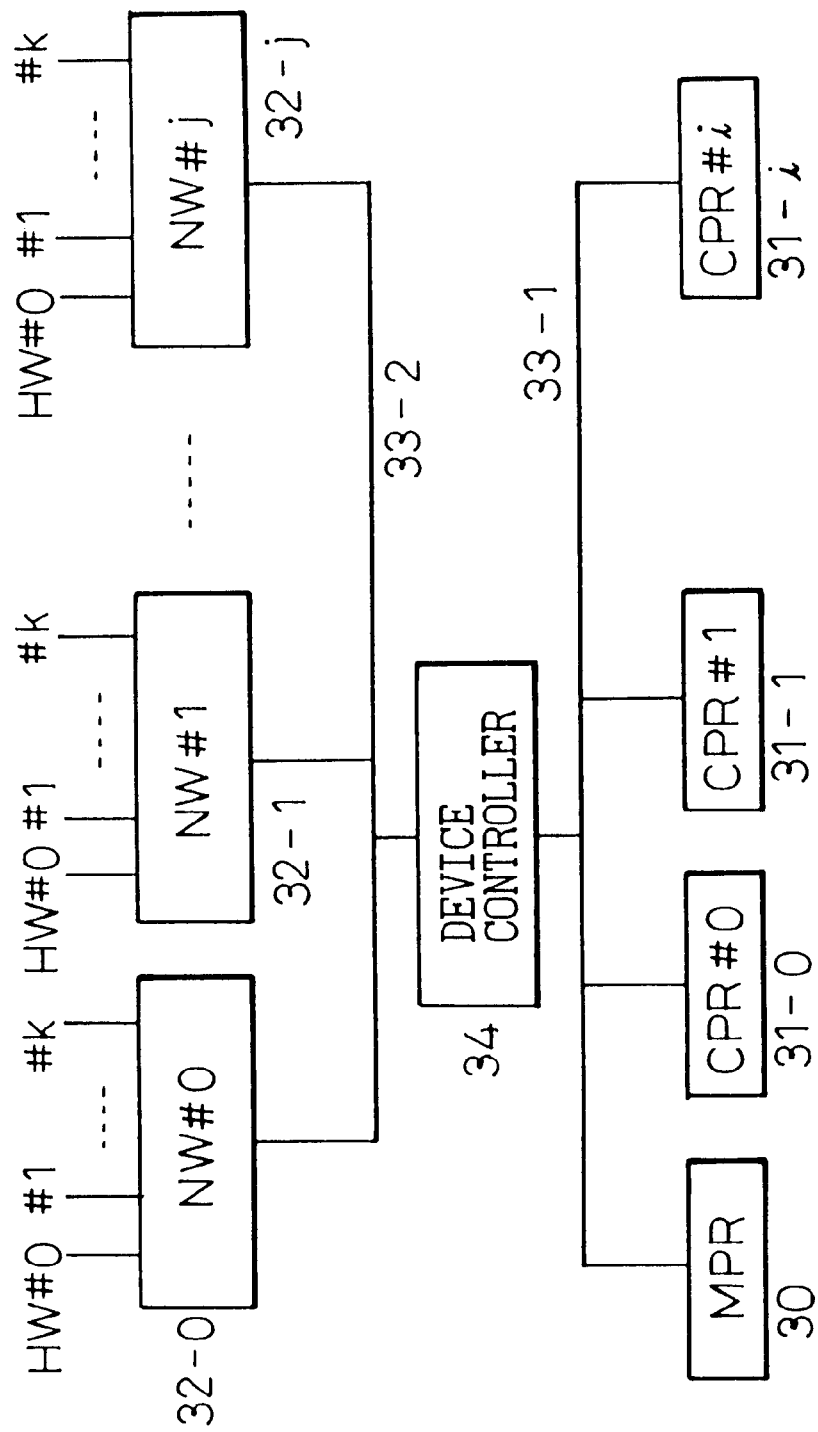
FIG. 13 is a block diagram showing an example in which the present invention is applied to a switching system.

FIG. 13 shows an example in which the present invention is applied to a switching system. Reference numeral 30 is a main controlling processor (MPR), 31-0 to 31-i are call processors (CPR#0 to CPR#i), 32-0 to 32-j are network devices (NW#0 to NW#j), 33-1 and 33-2 are buses, 34 is a device controller, and HW#0 to HW#k are highways.

This example is equivalent to the configuration shown in FIG. 1, where the input/output devices 2-0 to 2-j in FIG. 1 are configured as the network devices 32-0 to 32-j which perform switching of voice, image, and other data, the terminals in FIG. 1 are configured as the highways HW#0 to HW#k, and the processors 1-0 to 1-i are configured as the call processors 31-0 to 31-i. The device controller 34 is connected between the buses 33-1 and 33-2, and the call processors 31-0 to 31-i control the network devices NW#0 to NW#j.

Figure 14:
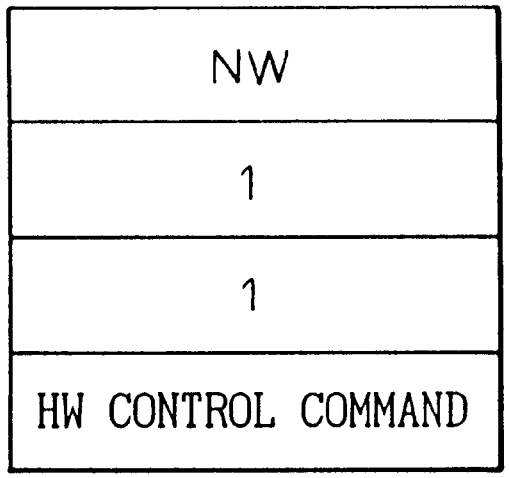
FIG. 14 is a diagram showing one example of the header information of a signal directed from a call processor to a network device.

FIG. 14 shows the header information when controlling a network device or highway from a call processor. Signal types here include NW device control, HW device control, NW maintenance command, HW maintenance command, NW initialization request, HW initialization request, download request, diagnostics activation, etc. In the illustrated example, destination type is NW, destination NW number is 1, destination HW number is 1, and signal type is HW control command. That is, the example shows the case where the call processor sends an HW control command to the highway with number 1 on the network device with number 1.

Figure 15:
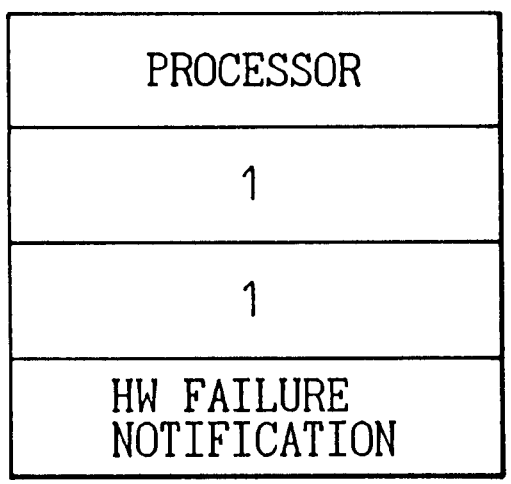
FIG. 15 is a diagram showing one example of the header information of a signal directed from a network device to a processor.

FIG. 15 shows the header information when sending a notification from a network device NW or highway HW to a call processor. Signal types here includes HW failure notification, NW failure notification, HW state notification, NW state notification, HW processing completion notification, NW processing completion notification, etc. In the illustrated example, destination type is processor, originating NW number is 1, originating HW number is 1, and signal type is HW failure notification. That is, the example shows the case where an HW failure notification concerning the highway with number 1 on the network device with number 1 is sent to the processor.

FIGS. 16 to 18 are diagrams for explaining mapping tables, showing by way of example the contents of the memory 20 in FIG. 2. FIG. 16 shows a mapping table providing a mapping of the network devices (NW) and highways (HW) to the call processors. HW numbers 0 and 1 with NW number 0 and HW number 0 with NW number 1 are mapped to the call processor number 0, while HW number 1 with NW number 1 and HW numbers 0 and 1 with NW number 2 are mapped to the call processor number 1.

FIG. 17 shows a mapping table providing a mapping of the network devices (NW) to the call processors. NW numbers 0 and 1 are mapped to the call processor number 0, and NW number 2 to the call processor number 1. FIG. 18 shows a mapping table providing a mapping of the highways (HW) to the call processors. HW numbers 0-0 and 0-1 (meaning HW numbers 0 and 1 both with NW number 0, similar designations being used hereinafter) and HW number 1-0 are mapped to the call processor number 0, while HW numbers 1-1, 2-0, and 2-1 are mapped to the call processor number 1.

FIG. 19 shows processor state data as an example of the contents of the memory 18 in FIG. 2. The states are 0=NOT MOUNTED, 1=MOUNTED, and 2=UNDER CONSTRUCTION. In the illustrated example, the processor numbers 1 and 0 are both in the state MOUNTED=1. FIG. 20 shows network device state data and highway state data as an example of the input/output device state data stored in the memory 19 in FIG. 2. The states are 0=NOT MOUNTED, 1=MOUNTED, 2=CLOSED, and 3=UNDER CONSTRUCTION. In the illustrated example, all NW and HW numbers are in the mounted state.

Figure 21:
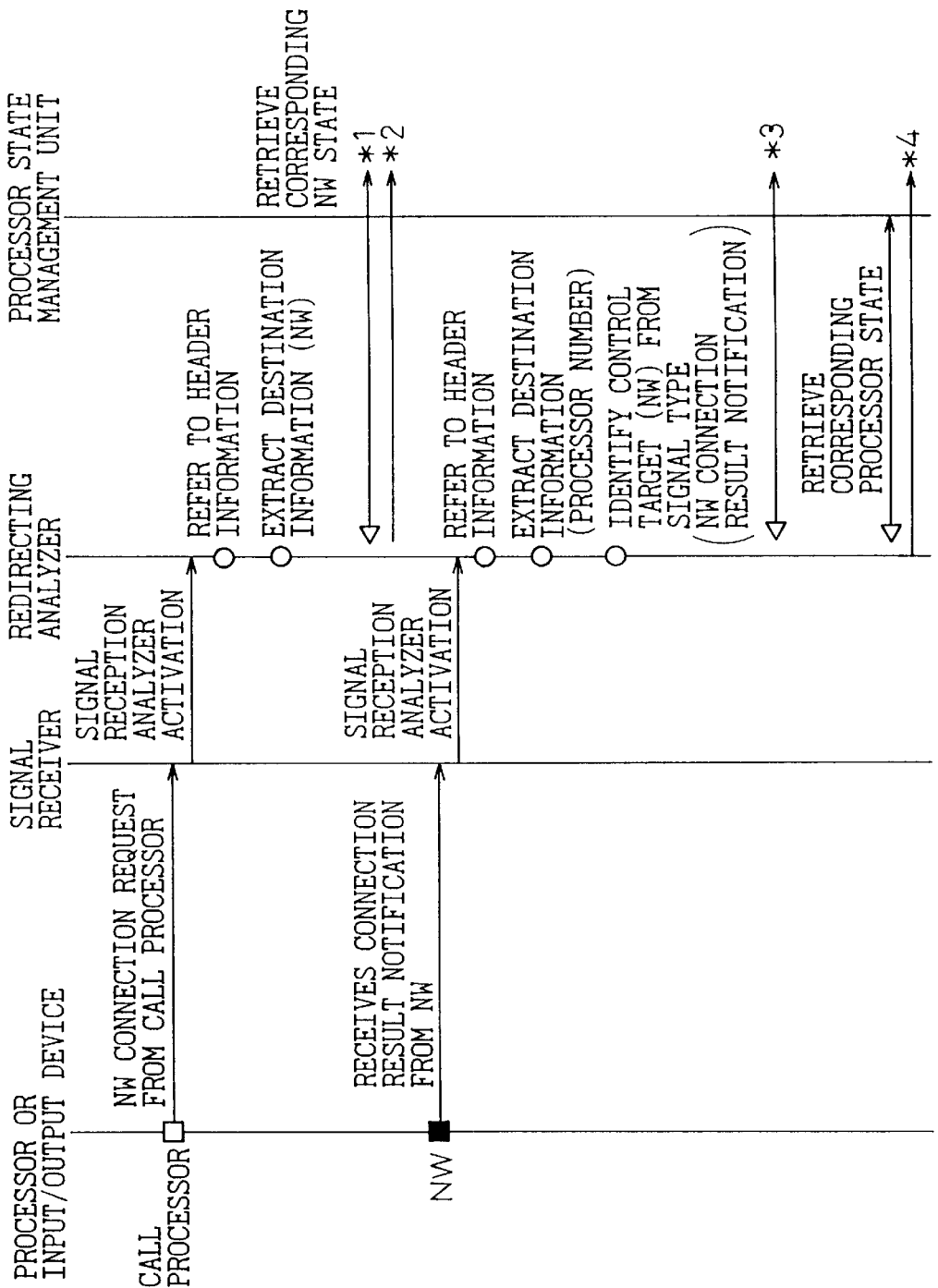
FIGS. 21 and 22 are sequence diagrams illustrating the operation of each part constituting the device controller 34 of FIG. 13.
Figure 22:
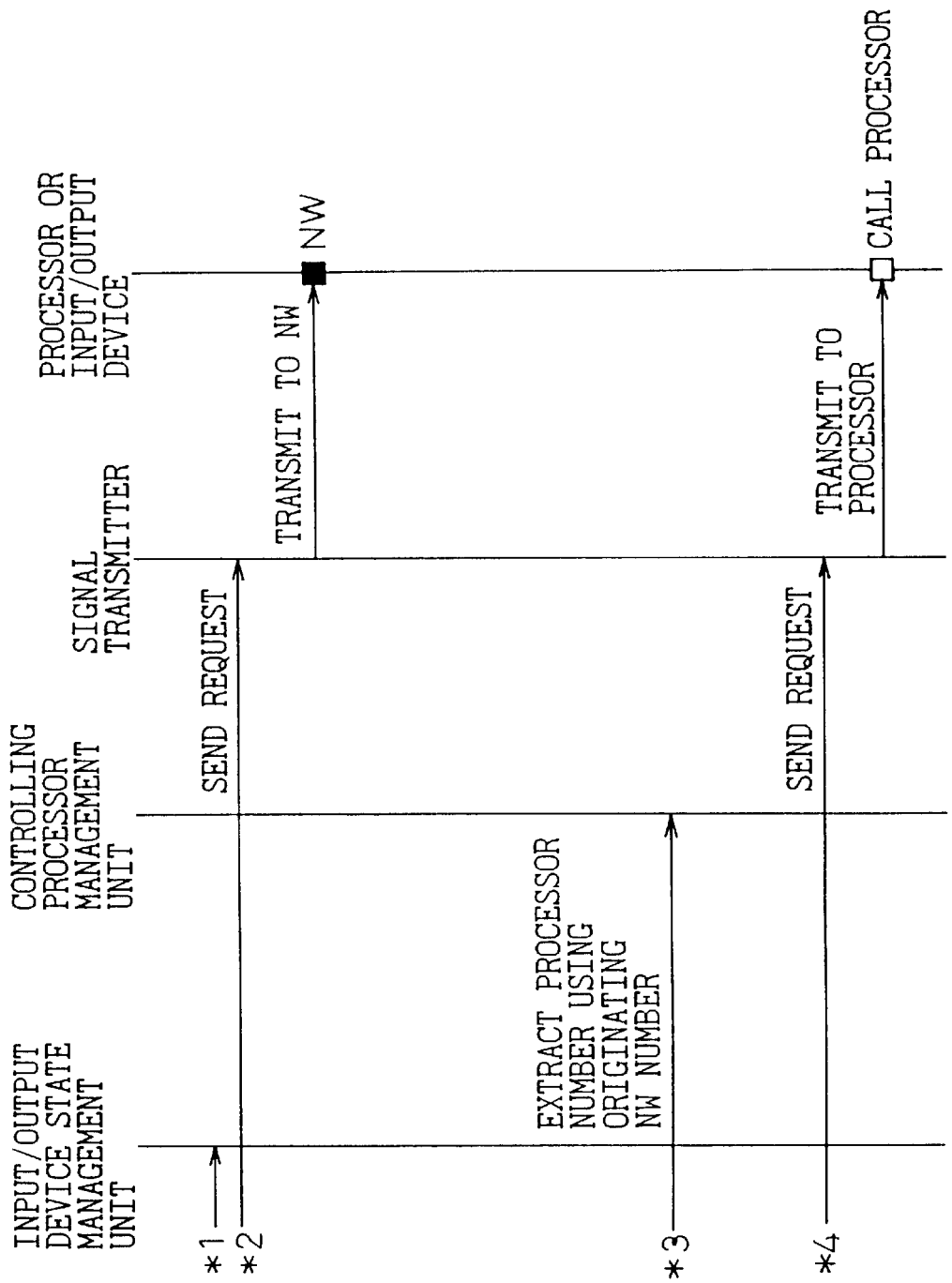

The device controller 34 shown in FIG. 13 has the same configuration as that shown in FIG. 2. FIGS. 21 and 22 are sequence diagrams illustrating the operation of each part constituting the device controller 34 of FIG. 13, i.e., the operation of the signal receiver 11, redirecting analyzer 13, processor state management unit 15, input/output device state management unit 16, controlling processor management unit 17, and signal transmitter 14 in the device controller responsive to the processor and input/output device operation.

For example, when controlling a network device as an input/output device, designated by one of reference numerals 32-1 to 32-j in FIG. 13, from its associated call processor designated by one of reference numerals 31-0 to 31-i, the call processor sends a connection request addressed to the network device (NW); thereupon, the signal receiver 11 in the device controller 34 receives the signal (a1) and activates the analyzer (a2) in accordance with the flowchart shown in FIG. 3, and the redirecting analyzer 13 extracts the destination information by referring to the header information shown in FIG. 14 in accordance with the flowchart of FIG. 5. In the illustrated example, destination NW number=1 is extracted, and the state data for the NW number=1 is retrieved via the input/output device state management unit 16. In this case, since the state data for the NW number=1 indicates 1 (mounted state), as shown in FIG. 20, the signal transmitter 12 is activated, and a send request is issued. The signal transmitter 12 transmits the signal to the network device (NW) specified by the header information. The network device (NW) can thus receive the signal by recognizing the addressee based on the NW number specified by the header information.

On the other hand, when reporting a state from a network device (NW) as an input/output device to its associated call processor, first the signal receiver 11 in the device controller 34 receives the signal (a1) and activates the analyzer (a2) in accordance with the flowchart shown in FIG. 3, and then the redirecting analyzer 13 extracts the destination information by referring to the header information shown in FIG. 15 in accordance with the flowchart of FIG. 5. Referring to FIG. 15, processor number=1 is extracted, and it is determined that the requested destination is the processor.

Further, the network device (NW) designated as the control target is identified from the signal type (in this case, NW connection result notification). Then, by referring to the mapping tables shown in FIGS. 17 and 18 via the controlling processor management unit 17, the processor number is extracted using the originating NW number. Based on the extracted processor number, the processor state data shown in FIG. 19 is examined via the processor state management unit 15; if the data indicates the mounted state, a send request is issued to the signal transmitter 12. Thereupon, the signal transmitter 12 transmits the signal to the call processor.

Next, remapping of an NW and an HW will be described. When changing the controlling processor of the network device with NW number 0 from the call processor with processor number 0 to the call processor with processor number 1, for example, an instruction with change type=NW remapping is sent to the data change controller 14 from the input/output means such as a maintenance terminal.

In accordance with this instruction, the data change controller 14 activates the input/output device state management unit 16 and changes the information data for the designated NW number=0 from 1 to 2 (from WORKING to CLOSED), as shown in FIG. 23. Then, the controlling processor management unit 17 is activated to change the processor number for NW number=0 from 0 to 1. Next, the input/output device state management unit 16 is activated to change the state data for NW number=0 from 2 (=CLOSED) to 1 (=WORKING). As a result of this change, the network device with NW number=0 is now controlled by the call processor with processor number=1.

When remapping only a highway (HW), for example, when the call processor associated with HW number 1-0 is to be changed from processor number 0 to processor number 1, an instruction with change type=HW remapping is issued to the data change controller 14 from the input/output means. In accordance with this instruction, the data change controller 14 first activates the input/output device state management unit 16 and changes the state data for HW number=1-0 from 1 to 2 (from WORKING to CLOSED), as shown in FIG. 25, and then activates the controlling processor management unit 17 and changes the controlling processor number for HW number=1-0 from 0 to 1, as shown in FIG. 26. Next, the input/output device state management unit 16 is activated to change the state data for HW number=1-0 from 2 (=CLOSED) to 1 (=WORKING). As a result of this change, the highway with HW number=1-0 is now controlled by the call processor with processor number=1.

Figure 27:
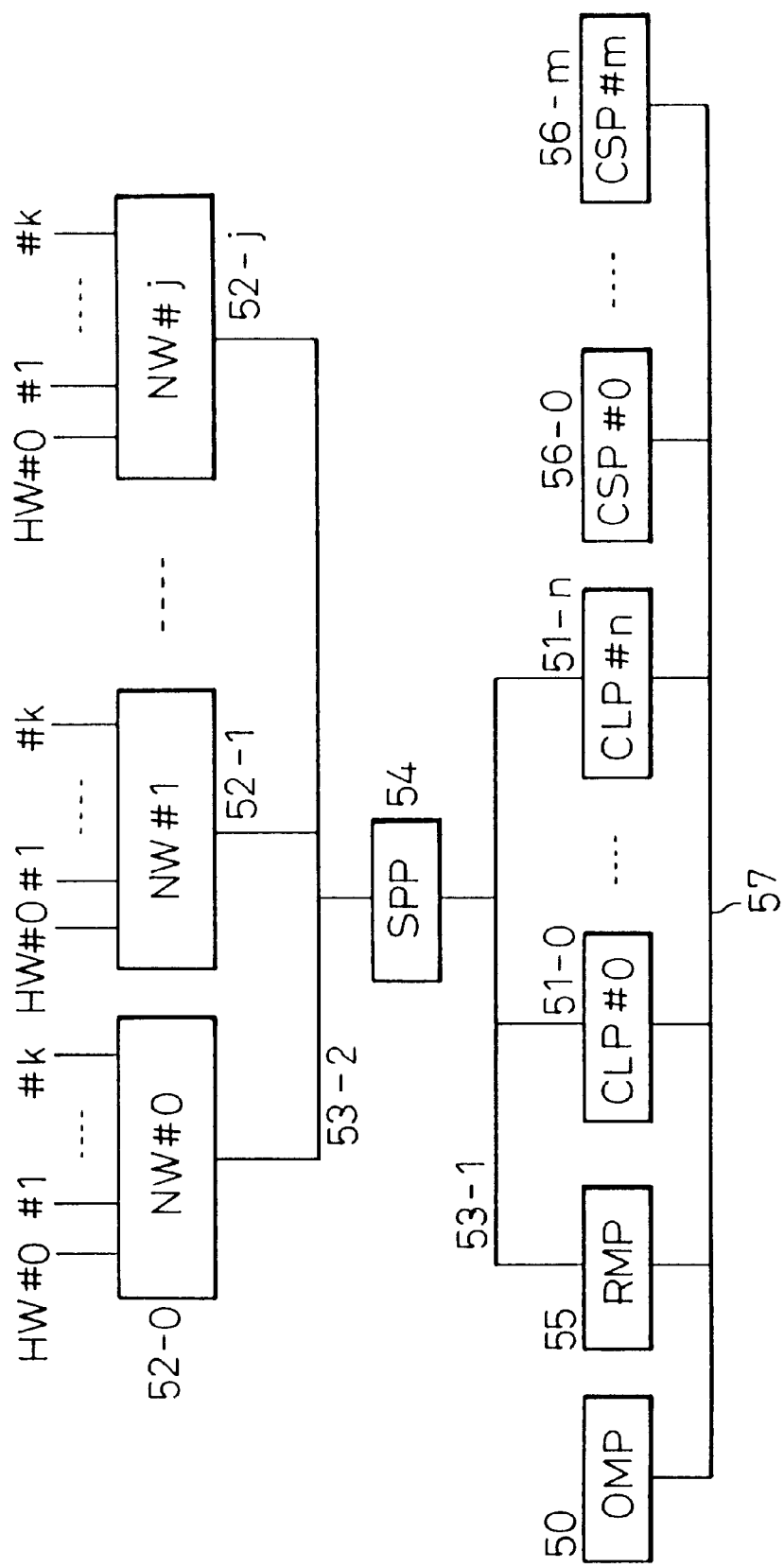
FIG. 27 is a block diagram showing a second example in which the present invention is applied to a switching system.

FIG. 27 shows a second example in which the present invention is applied to a switching system. Reference numeral 50 is a main controlling processor (OMP), 51-0 to 51-n are call processors (CLP#0 to CLP#n), 52-0 to 52-j are network devices (NW#0 to NW#j), 53-1 and 53-2 are buses, 54 is a device controlling processor (SPP), 55 is a resource management processor (RMP), 56-0 to 56-m are signal processors (CSP#0 to CSP#m), and 57 is a bus.

In this example also, the call processors 51-0 to 51-n correspond to the processors 1-0 to 1-i in FIG. 1, the network devices 52-0 to 52-j correspond to the input/output devices 2-0 to 2-j in FIG. 1, the device controlling processor 54 corresponds to the device controller 4 in FIG. 1, and the highways HW#0 to HW#k correspond to the terminals in FIG. 1.

The plurality of highways HW#0 to HW#k are connected to each of the network devices 52-0 to 52-j. The call processors 51-0 to 51-n control the designated network devices 52-0 to 52-j, and perform processing such as path formation between the highways HW#0 to HW#k.

The device controlling processor 54 has the same configuration as the previously described device controller (see FIG. 2), and is responsible for the control of signal transmission and reception and the management of the various state data and the mapping data associating the network devices 52-0 to 52-j and highways HW#0 to HW#k with the call processors 51-0 to 51-n. Accordingly, the addition or removal of a network device or highway and any other change in the load sharing among the call processors can be readily handled just by entering necessary information directly to the device controlling processor 54 or via a maintenance terminal, etc. not shown, and by updating the corresponding mapping table by referring to the relevant state data.

Figure 28:
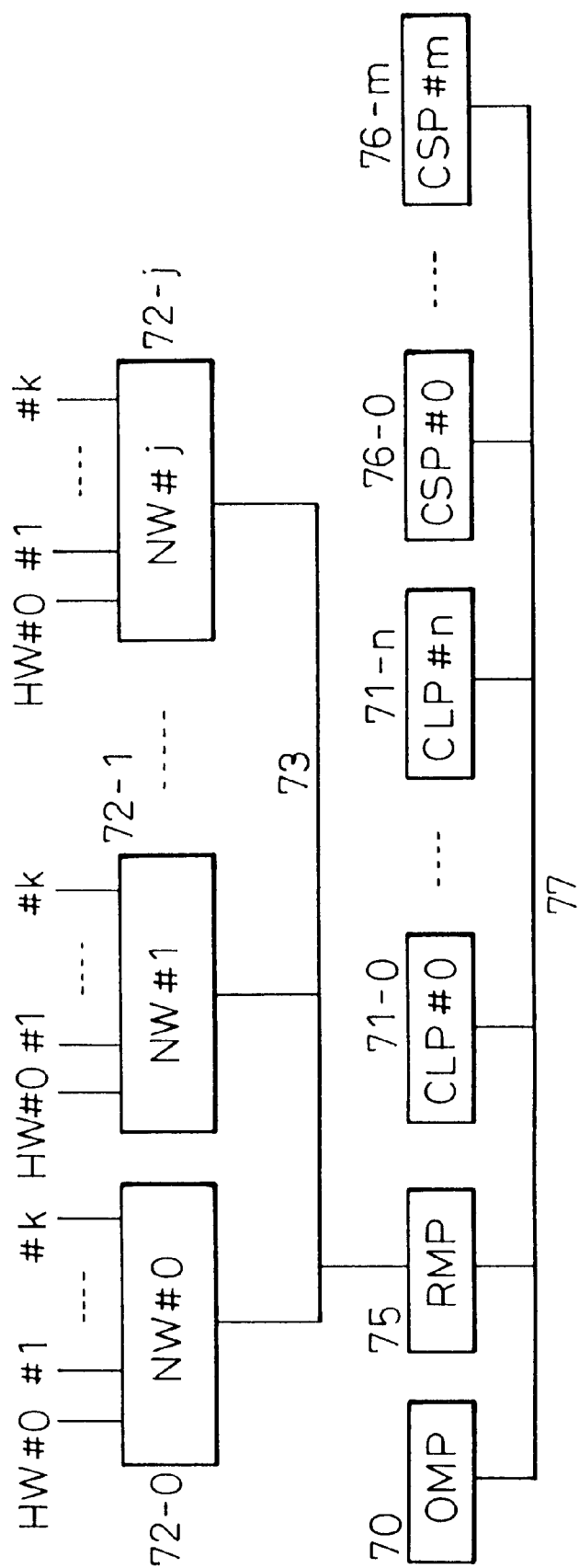
FIG. 28 is a block diagram showing a third example in which the present invention is applied to a switching system.

FIG. 28 shows a third example in which the present invention is applied to a switching system. Reference numeral 70 is a main controlling processor (OMP), 71-0 to 71-n are call processors (CLP#0 to CLP#n), 72-0 to 72-j are network devices (NW#0 to NW#j), 73 and 77 are buses, 75 is a resource management processor (RMP) having the function of the device controller, and 76-0 to 76-m are signal processors (CSP#0 to CSP#m). The network devices 72-0 to 72-j are each connected to highways HW#0 to HW#k.

In this example, the resource management processor 75, which manages the resources within the switching system and collects the various state data, is equipped with the function of the device controller of FIG. 2 for managing the association of the call processors 71-0 to 71-n with the network devices 72-0 to 72-j and highways HW#0 to HW#k. Since the mapping data can be changed by entering necessary information directly to the resource management processor 75 or via a maintenance terminal not shown, any changes in the system configuration can be readily handled by changing the mapping data, without requiring bus reconnection or other work. That is, as in the foregoing examples, when a call processor is added or removed, or when a network device or highway associated with a specific call processor is remapped or added, for example, such changes can be readily handled by applying corresponding changes to the mapping table managed by the resource management processor 75.

Figure 29:
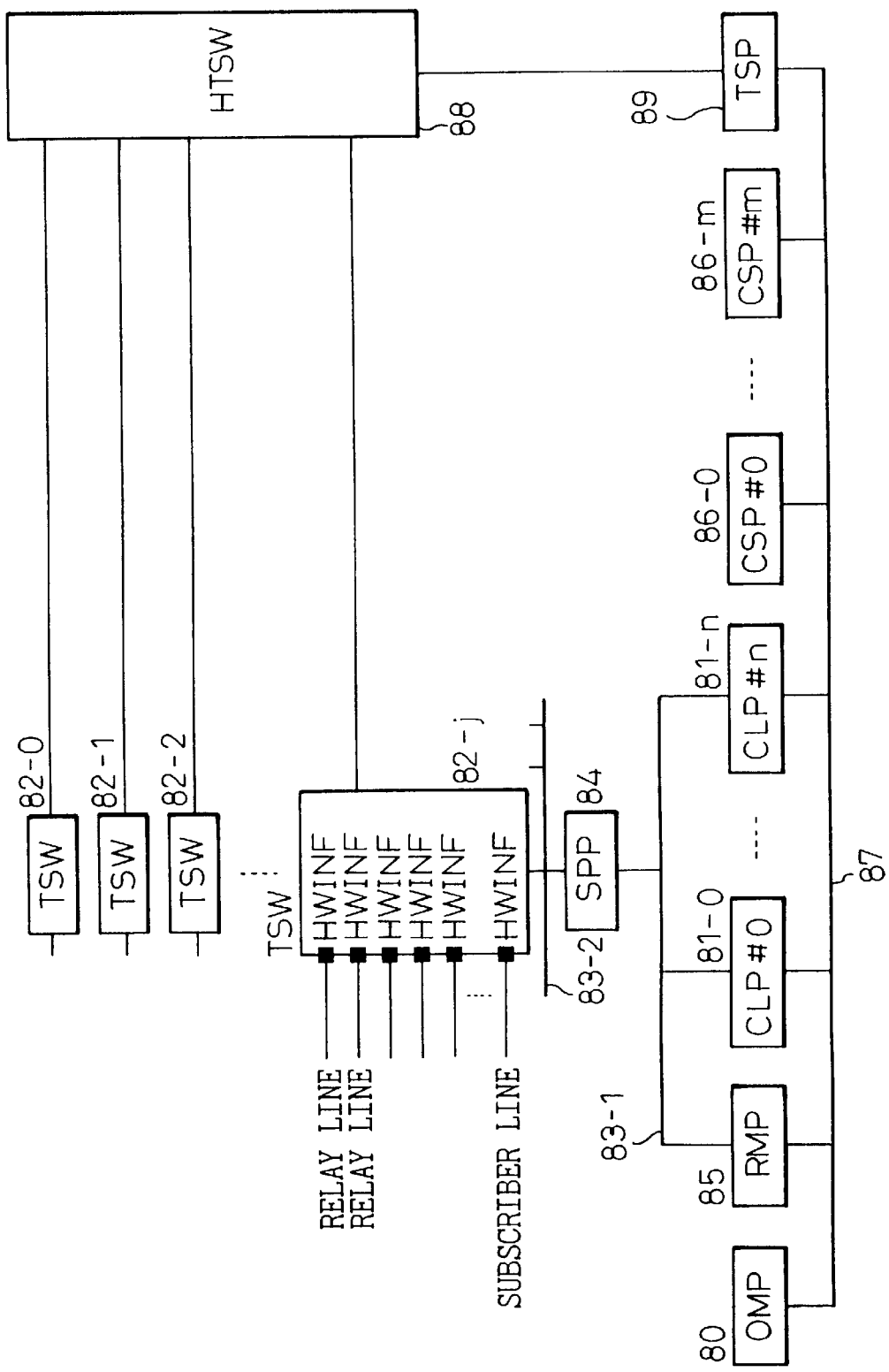
FIG. 29 is a block diagram showing a fourth example in which the present invention is applied to a switching system.

FIG. 29 shows a fourth example in which the present invention is applied to a switching system. Reference numeral 80 is a main controlling processor (OMP), 81-0 to 81-n are call processors (CLP#0 to CLP#n), 82-0 to 82-j are time switches (TSW), 83-1 and 83-2 are buses, 84 is a device controlling processor (SPP), 85 is a resource management processor (RMP), 86-0 to 86-m are signal processors (CSP#0 to CSP#m), 87 is a bus, 88 is a common time switch (HTSW), 89 is a common time switch controlling processor (TSP), and HWIF is an interface for accommodating a relay line or a subscriber line.

This example concerns an application to a time-division switching system. The time switches 82-0 to 82-j correspond to the network devices 52-0 to 52-j in FIG. 27, and the relay lines and subscriber lines correspond to the highways HW#0 to HW#k in FIG. 27. The device controlling processor 84 corresponds to the device controlling processor 54 in FIG. 27 or the device controller 4 in FIG. 1. The time switches 82-0 to 82-j each accommodate relay lines, subscriber lines, etc. via the respective interfaces HWIF. Time slot interchange control is performed on the time switches 82-0 to 82-j by the call processors 81-0 to 81-n via the bus 83-2, device controlling processor 84, and bus 83-1.

The common time switch 88 performs time slot switching between the time switches 82-0 to 82-j. The common time switch 88 can be configured as a space switch to perform connection switching between the time switches 82-0 to 82-j. In that case, a time-division switching machine of T-S-T configuration, i.e., time switch (T) - space switch (S) - time switch (T), is constructed. The time switches 82-0 to 82-j can also be configured to incorporate a space switch.

In this example also, as in the foregoing examples, when remapping, addition, or other changes occur in the configuration of the call processors 81-0 to 81-n or in the configuration of the relay lines and subscriber lines accommodated in any one of the time switches 82-0 to 82-j associated with the respective call processors, such changes can be readily handled by applying corresponding changes to mapping table managed by the resource management processor 85.

It is also possible to construct an ATM switching machine by configuring the time switches 82-0 to 82-j and the common time switch 88 as ATM switches. In that case, even if a self-routing configuration is employed for the ATM switches, since controls such as cell flow control and cell header control are performed by the processors, any changes in the system configuration comprising multiple processors can be readily handled.

The present invention is not limited to the foregoing examples, but can be applied to various information processing systems of multiprocessor configuration. Further, the memories 18, 19, and 20 can be constructed from one common memory configured to store the respective state data and mapping data. Each functional unit in the device controller 4 can be implemented in hardware for faster processing speed, but alternatively, it may be implemented using the processing function of a processor, as shown in FIGS. 27, 28, and 29. Further, as shown in FIG. 28, part of the function of a processor performing other processing can be used to implement the function of the device controller.

What is claimed is:

1. An information processing system comprising:

a plurality of input/output devices each having a plurality of input/output terminals;

a plurality of processors; and a device controller, provided between said input/output devices and said processors, for storing mapping data defining a mapping of said input/output devices and said input/output terminals to said processors and state data indicating states of said input/output devices, said terminals, and said processors, and for controlling transfer of transmit/receive information from said input/output devices and said input/output terminals to said processors and vice versa by referring to said mapping data and said state data;

wherein said device controller includes: a processor state management unit for storing processor state data in a memory for management; an input/output device state management unit for storing input/output device state data and input/output terminal state data in a memory for management; and a controlling processor management unit for storing said mapping data of said input/output devices and said input/output terminals to said processors in a memory for management; and wherein said device controller further includes a data change controller for changing said mapping data by referring to said state data.

2. An information processing system according to claim 1, wherein said device controller further includes a redirecting analyzer for redirecting said transmit/receive information to be transferred between said processors and said input/output devices or said input/output terminals, based on header information contained in said transmit/receive information and on said state data and said mapping data.

3. An information processing system according to claim 1, wherein a resource management processor for managing system resources is equipped with the function of said device controller.

\* \* \* \* \*